June 5, 1928.　　　　　　　S. B. SARGENT　　　　　　　1,672,394
VALVE
Filed July 19, 1924
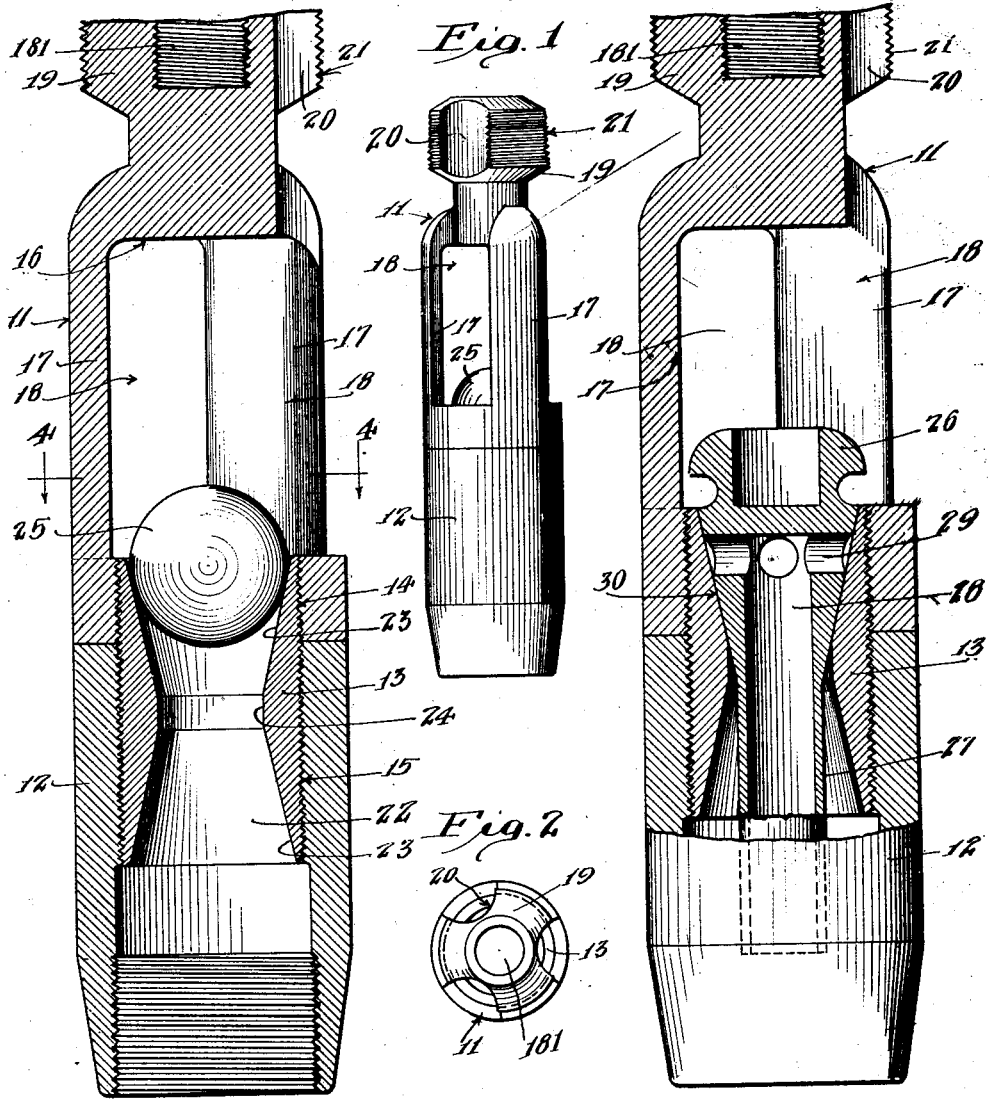
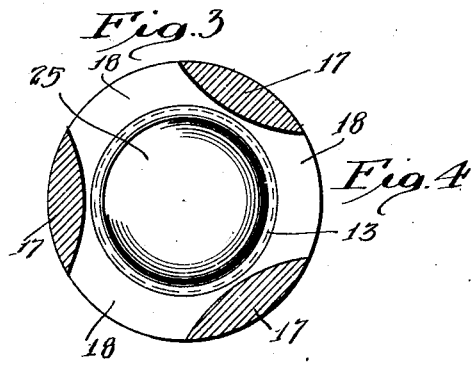
Inventor
Sumner B. Sargent
By Lyon & Lyon attys Patented June 5, 1928.

1,672,394

UNITED STATES PATENT OFFICE.

SUMNER B. SARGENT, OF NEAR HUNTINGTON PARK, CALIFORNIA.

VALVE.

Application filed July 19, 1924. Serial No. 727,026.

This invention relates to valves, and more especially to the type of valve employed in deep well pumps such as are used in the pumping of oil.

A very important object of the invention is to obtain a greater flow of fluid through a pump of a given size than has been possible heretofore.

Another object is to insure against sticking of the valve plug in the cage.

Another object is to facilitate removal of the valve from the well in the event of the Garbut rod or other pulling device breaking close to the valve cage.

Another object is to lengthen the term of service of the valve seat.

A further object is to construct a valve plug that will admit of maximum flow of liquid upon slight lift of the valve.

A still further object is to make a valve seat that permits of adjustment of the valve seat to different heights in the cage thus to avoid the necessity of manufacturing and carrying in stock valves having different "lifts".

The accompanying drawings illustrate the invention:

Fig. 1 is a side elevation of a valve constructed in accordance with the provisions of this invention.

Fig. 2 is a plan view looking at the upper end of Fig. 1.

Fig. 3 is a longitudinal midsection of the valve shown in Fig. 1.

Fig. 4 is a plan section on the line indicated by 4—4, Fig. 3.

Fig. 5 is a longitudinal section, similar to Fig. 3, showing a different form of valve plug, the lower end of the valve barrel being shown in elevation.

The valve comprises a cage 11 and a tubular barrel 12. In prior constructions of valves of this description the barrel 12 is screw threaded into the valve cage, and a flanged valve seat is confined between the cage and barrel, thus making three thicknesses of metal and, accordingly, making the cross sectional area of the valve port considerable less than that of the plunger bore. By my construction I am enabled to increase the diameter of the valve port for I do not screw thread the barrel into the valve cage but screw thread both the cage and barrel upon the valve seat 13 as indicated at 14, 15, respectively. The valve seat functions as a close nipple to hold the cage and barrel together and the cage and barrel having squared abutting ends, thus insuring against leakage at this joint. It will be seen that this is an important feature of the invention since I am enabled by this construction to eliminate one thickness of metal, thus enlarging the valve bore by that amount.

Heretofore, because of the necessity of tightening the barrel against the flange of the ordinary valve seat, it was not possible to tightly seat the barrel against the cage, but my construction makes this possible as is clearly seen in the drawings.

It is evident that, because of the screw threads 14, the valve seat 13 can be adjusted lengthwise in the cage 11 so as to change the clearance between said seat and the valve-lift limiting abutment 16 of the valve cage. Heretofore it has been necessary to manufacture and carry in stock valve cages of three different lengths to provide for three different "lifts" of the valve. My construction avoids this.

The valve cage illustrated has vertical ribs 17 and between said ribs are the cage openings 18 to permit the outflow of liquid. In prior constructions of valve cages the inner faces of the ribs 17 were concave and approximately fitted the curved surface of the valve ball, thus making it comparatively easy for the deposit of sediment between the ball and ribs to cause sticking of the valve in the cage. In this instance, the inner faces of the ribs 17 are constructed so that only point contact is possible between the valve plug and ribs. Therefore, the longitudinal margins of the ribs 17 are spaced farther from the axis of the valve base than are the middle portions of said ribs and, preferably, the inner faces of the ribs are convex as clearly shown in Fig. 4.

The upper end of the cage 11 is provided, as is usual, with a threaded socket 181 to receive a Garbut rod or other valve pulling device, if the valve is a standing valve, and to receive the sucker line in the event of the valve being a plunger valve, as is readily understood.

The upper end of the cage 11 is in the form of an enlarged head 19 provided with longitudinally extending channels 20 that are in alinement with the openings 18 so that the liquid issuing from the openings 18 can readily pass upwardly through the channels 20. The interchannel portions of the head 19 are screw threaded as indicated at 21 so that, in the event of the Garbut rod, or other rod connected with the socket 181, breaking off, a tubing of the correct diameter may be lowered into the well and screwed onto the head 19 for withdrawing the valve from the well. An old plunger barrel may be used for this purpose, the diameter of the threaded portion being the same as that of a plunger barrel for a pump of the size taking the valve. Or, if desired, the threads 21 may be in the form of tap threads, as shown, so that a plain piece of tubing may be lowered and the threads cut in its lower end by the head 19 by turning the tubing.

It will be seen that the bore or port 22 of the seat 13 is slightly tapered upwardly and outwardly for an appreciable distance and constitutes a venturi. This construction of the port 22 increases the flow of liquid above what it would be if the port were straight. It is desirable to expand the bore 22 outwardly at both ends as indicated at 23 and, in some instances, to provide an intermediate straight portion 24, the purpose of which will be made clear hereinafter. The taper is preferably between thirteen and fourteen degrees to obtain maximum flow of the liquid.

The form of the valve plug may vary and I have shown it in Figs. 1 to 4 inclusive in the form of a ball 25 which is the usual construction. However, it is customary to make the valve ball of greater diameter than the seat bore or port so as to rest upon the upper end of the seat. The ordinary valve seat bevel is extremely narrow and when, through wear, it becomes deeply pitted, leakage past the closed valve takes place. I avoid this objectionable feature by making the valve ball of no greater diameter than the largest diameter of the seat bore or port so that the valve ball will fit within the bore and, as the seat wears away, the valve wall will follow down and seat against an unworn portion of the tapered face of the valve seat. When the seat is worn down to approximately its middle, the seat may be reversed. The straight portion 24 prolongs the life of the seat without unduly constricting the port area, and it is preferable to make the seat of sufficient length to obtain the maximum flow of liquid for the cross sectional area of the bore.

In Fig. 5 is shown a valve plug 26 of a different form, the same having a conic-frustum upper portion and a cylindrical guide 27 extending down from the conic-frustum portion.

Extending from the lower end of the guide 27 to near the upper end of the valve plug is an axial duct 28 communicating at its upper end with one or more laterally extending ports 29 that open to the tapered face 30 of the valve plug at a point slightly below the upper end of the seat 13 when the valve plug is closed. Thus, when the plug is closed, the ports 29 will be closed. When the plug 26 opens, it will only need to lift a slight distance to open the ports 29 and the liquid will then flow through the valve plug as well as around the same. Thus maximum flow of liquid through the valve will occur early in the lifting movement of the valve.

I claim:

1. A pump valve for liquids comprising a cage provided with a threaded base portion, a barrel provided with a threaded upper portion, a seat provided with external screw threads of uniform diameter from end to end thereof engaging the threaded portion of the cage and barrel, the cage and barrel having squared abutting ends, and a valve plug for the seat, the inside diameter of the threaded portions of the cage and barrel being less than the inside diameter of the unthreaded portions thereof so that the cage and barrel will fit close together irrespective of the adjustment of the seat longitudinally of the cage.

2. A pump valve for liquids comprising a cage provided with a threaded base portion, a barrel provided with a threaded upper portion, a seat provided with external screw threads of uniform diameter from end to end thereof engaging the threaded portion of the cage and barrel, the cage and barrel having squared abutting ends, and a valve plug for the seat, the inside diameter of the threaded portion of the cage being less than the inside diameter of the unthreaded portion thereof so that the cage and barrel will fit close together irrespective of the adjustment of the seat longitudinally of the cage.

3. The valve cage described having openings in its side and having a head provided with longitudinal channels alined with the openings, said head being provided with external screw threads on the interchannel portions and with a threaded socket.

4. A pump valve for liquids comprising a cage, a valve seat connected with the cage and provided with relatively long slightly tapered bore portions forming a venturi, the taper being no greater than fourteen degrees and a free-floating valve plug provided with a frusto-conical portion fitting from end to end of one of the tapered bore portions.

5. A pump valve for liquids comprising a cage, a valve seat connected with the cage and provided with relatively long slightly tapered bore portions forming a venturi, the taper being no greater than fourteen degrees and a free-floating hollow valve plug provided with a frusto-conical portion fitting from end to end of one of the tapered bore portions.

6. A pump valve for liquids comprising a cage, a valve seat connected with the cage and provided with a tapered bore portion, and a valve plug provided with a frusto-conical portion fitting from end to end of said tapered bore portion, said valve plug provided with a duct extending upwardly from the lower end of the valve plug and said valve plug provided with a duct extending laterally from the first mentioned duct to that portion of the tapered face of the valve plug positioned in the tapered bore portion when the valve plug is in closed position.

7. A pump valve for liquids comprising a cage, a valve seat connected with the cage and provided with a tapered bore portion, and a valve plug provided with a frusto-conical portion fitting from end to end of said tapered bore portion, said valve plug provided with a cylindrical guide extending through the seat bore, said valve plug provided with a duct extending through the guide into the frusto-conical portion, and said valve plug provided with a duct extending laterally in the frusto-conical portion from the first mentioned duct to that portion of the tapered face of the valve plug positioned in the tapered bore portion when the valve plug is in closed position.

8. A valve comprising a cage, a valve seat connected with the cage and having an upwardly and outwardly uniformly tapered bore portion, the angle of taper being between thirteen and fourteen degrees, and a valve plug tapered to fit inside of said bore portion from end to end thereof.

Signed at Los Angeles, California, this 7th day of July, 1924.

SUMNER B. SARGENT.